United States Patent [19]

Seidel et al.

[11] 4,156,306
[45] May 29, 1979

[54] METHOD OF MANUFACTURING REGENERATIVELY COOLED ROCKET COMBUSTION CHAMBERS

[75] Inventors: Albert Seidel; Dietmar Wolf, both of Siegertsbrunn; Gunther Pulkert, Haar; Karl Butter, Ottobrunn; Kuno Knauer, Jakob-Neuharting, all of Fed. Rep. of Germany

[73] Assignee: Messerschmitt-Bölkow-Blohm GmbH, Fed. Rep. of Germany

[21] Appl. No.: 861,350

[22] Filed: Dec. 16, 1977

[30] Foreign Application Priority Data

Dec. 18, 1976 [DE] Fed. Rep. of Germany ....... 2657474

[51] Int. Cl.² .......................... C25D 1/02; C25D 1/20
[52] U.S. Cl. ....................................... 29/423; 204/16; 204/9
[58] Field of Search ....................... 204/3, 4, 9, 25, 16; 29/455 R, 423, 527.2; 60/267, 39.66

[56] References Cited

U.S. PATENT DOCUMENTS

| 3,595,025 | 7/1971 | Stockel | 204/9 |
|---|---|---|---|
| 3,690,103 | 9/1972 | Dederra | 204/9 |
| 3,692,637 | 9/1972 | Dederra | 204/9 |
| 3,738,916 | 6/1973 | Butter et al. | 204/9 |
| 3,768,256 | 10/1973 | Butter et al. | 204/9 |
| 3,835,644 | 9/1974 | Butter et al. | 204/9 |
| 3,897,316 | 7/1975 | Huang | 204/9 |

*Primary Examiner*—T. M. Tufariello
*Attorney, Agent, or Firm*—McGlew and Tuttle

[57] ABSTRACT

A method of manufacturing a regeneratively cooled rocket combustion chamber which includes a thrust nozzle portion connected to a combustion chamber portion and which is constructed with cooling channels which extend in the longitudinal direction between an inner shell or wall having a smooth interior surface and an outer shell or wall and which are laterally bounded by radially extending webs, comprises forming the inner shell along with the cooling channel webs by electrodepositing metal on an electroplating core which is made up of chemically dissolvable material and has its outside contour conformable to the inside contour of the inner wall of the combustion chamber which is provided with radially extending projections forming mold blades for the webs defining the lateral boundaries of the cooling channels. Thereafter, the cooling channels are filled with a multiple electrically well-conducting filling material up to the level of the outer ends of the webs after these outer ends have been finish turned. A metal layer is then electrodeposited around the complete periphery of the web end faces and over the periphery of the cooling channels to form the outer shell or wall. The filling material is then melted out of the cooling channels and the electroplating core is hollowed out except for some millimeters of residual wall thickness and the remnant of the core is dissolved along with the radial projections to form the slots between the cooling channel webs which open into the center of the combustion chamber. The entire electrodeposited rocket combustion chamber is then engaged over the finishing mandrel and while it is on the mandrel, the cooling channels are deformed by applying pressure from inside the channels to close the slot which extends between the webs. When the thrust nozzle portion is formed integrally with the combustion chamber, the mandrel is transversely parted in the nozzle throat plane to permit insertion during the deforming of the cooling channels.

1 Claim, 3 Drawing Figures

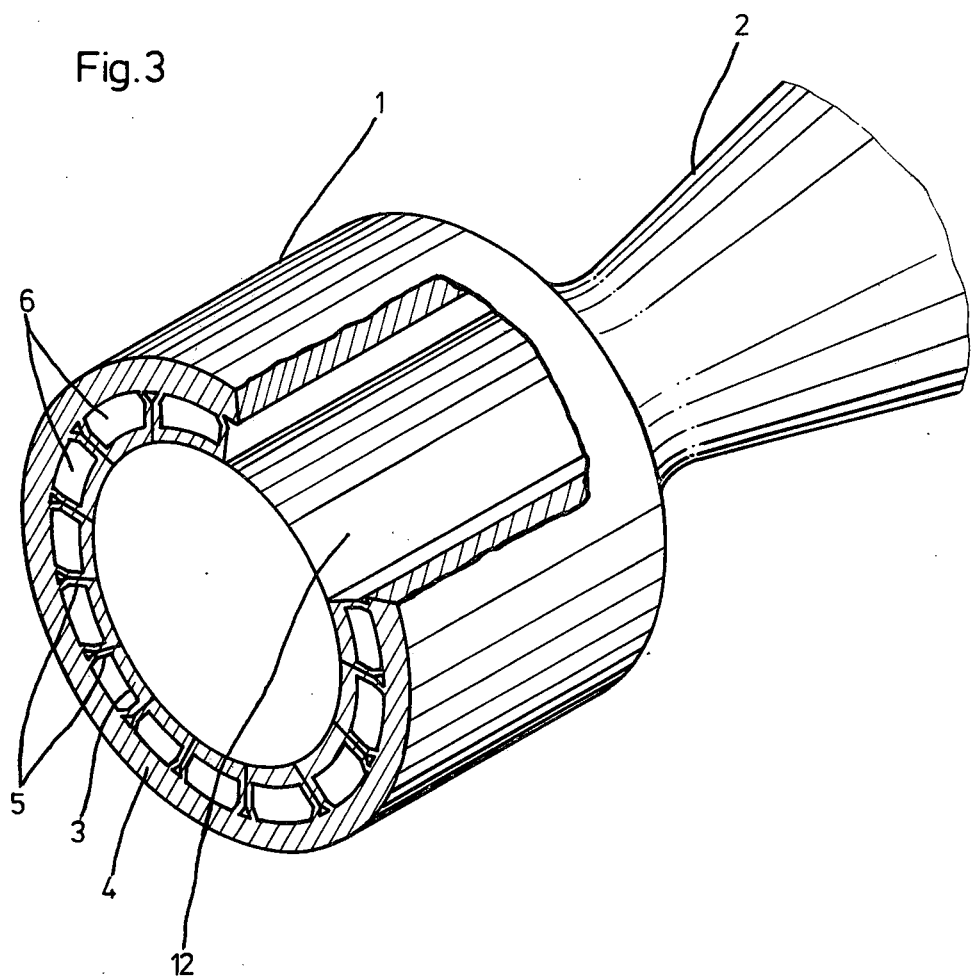

METHOD OF MANUFACTURING REGENERATIVELY COOLED ROCKET COMBUSTION CHAMBERS

FIELD AND BACKGROUND OF THE INVENTION

This invention relates to a method manufacturing rocket engines in general and, in particular, to a new and useful method of manufacturing regeneratively cooled rocket combustion chambers and/or thrust nozzles.

DESCRIPTION OF THE PRIOR ART

Such a manufacturing method and a rocket combustion chamber with a thrust nozzle made, in accordance therewith, completely of nickel, is known from German Offenlegunsschrift No. 2,137,109. As compared to another known construction of the same size in which, instead of electrodepositing nickel to form the inner shell and the cooling channel webs, a forged basic body in one piece and made of copper containing no oxygen is provided having longitudinally extending cooling channels milled into its outer surface, the constructional weight of the above-mentioned rocket combustion chamber and thrust nozzle entirely manufactured by electrodeposition is about 35% smaller.

SUMMARY OF THE INVENTION

The present invention is directed to a development of the manufacturing method of the kind indicated above, permitting, in an inexpensive manner, the preventing of the hot combustion gases from becoming stagnant in the slots which are open toward the hot gas area during operation of the rocket chamber and which are formed in the cooling channel webs following the chemical dissolution of the radial projections of the electroplating core so that no stagnation occurs which may locally overheat the cooling channel webs.

In accordance with the invention, the operational step of chemically dissolving the remnant of the electroplating core is followed by a step in which the fully electrodeposited rocket chamber and/or thrust nozzle is engaged on an exactly fitting mandrel which is transversely parted in the nozzle throat plane, and by a further step in which, in this engaged position on the mandrel, the cooling channels are deformed by a pressure applied from inside the channels, whereby, the slots extending between the webs of adjacent cooling channels are closed.

The carrying out of the inventive operational steps does not cause any problems. The result obtained is a relatively light rocket combustion chamber and/or thrust nozzle, capable of high performance and made entirely by electrodeposition, in which, during operation, the cooling channel webs are protected against thermal overstressing from a stagnation of hot combustion gases in slots forming dead spaces. The inventive closing of the slots further proves advantageous in another direction, that is, due to this provision, the cooling channel webs become prestressed, whereby, the stresses occurring during operation are reduced.

Accordingly, it is an object of the invention to provide an improved method of forming an internal combustion chamber using an electroplating core having a plurality of radially extending circumferentially spaced blades and which comprises forming an inner combustion chamber wall by electrodepositing metal over the periphery of the core and around the projections, finishing off the periphery of the projecting portions of the electrodeposited metal, filling channels which are deformed between projections of the electrodeposited metal with a defusable material, electrodepositing a metal layer around the complete periphery of the web faces and the cooling channels to form the outer shell or wall, subsequently melting the filling material out of the cooling channels, hollowing out the electroplating core except for some millimeters of residual wall thickness and dissolving the remnant of the core along with the radial projections for forming slots between the cooling channel webs which are open into the center of the combustion chamber and subsequently engaging the entire electrodeposited rocket combustion chamber on the finishing mandrel which is dimensioned to the exact interior dimensions of the combustion chamber and, while it is on the mandrel, deforming the cooling channels by applying pressure from the inside channels in order to close the slots which extend between the webs of adjacent cooling channels.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 3 is a view similar to FIG. 1, showing the final formation of the combustion chamber on a mandrel.

DESCRIPTION OF THE PREFERRED EMBODIMENT

Figure 1:
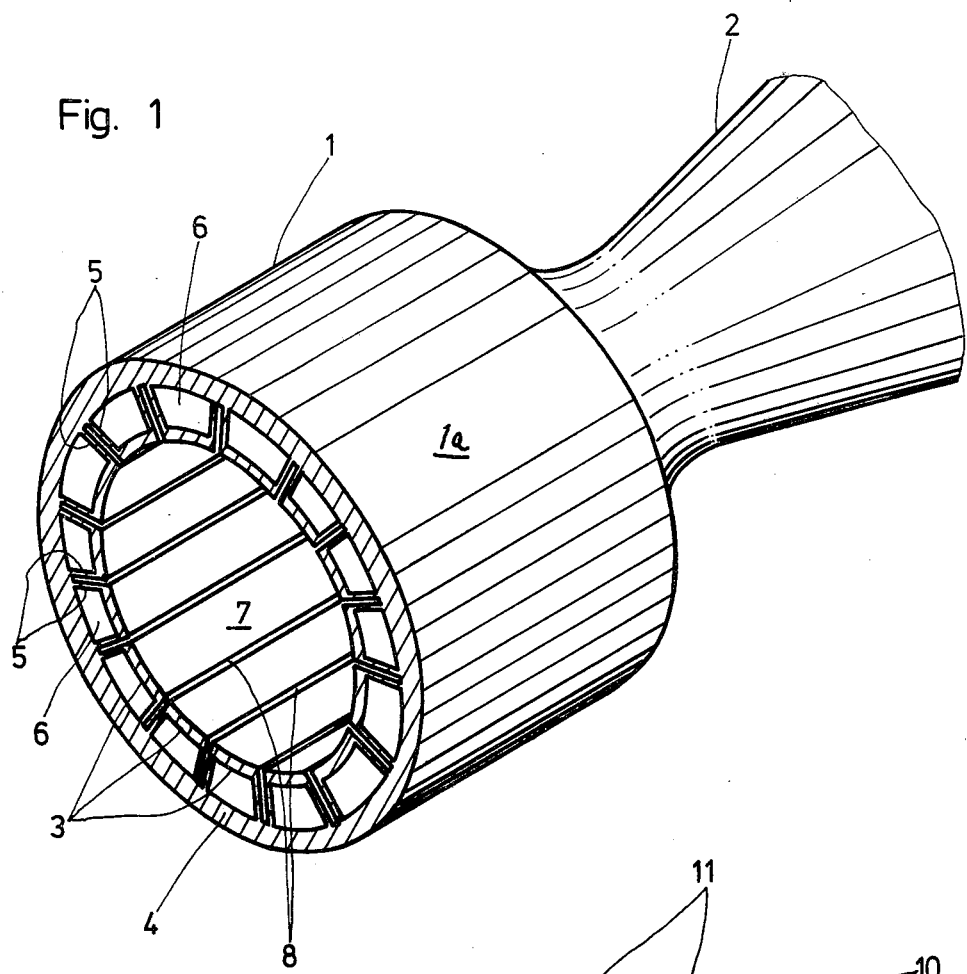
FIG. 1 is a rear perspective view, partly in section, of a rocket combustion chamber with a thrust nozzle portion in a first stage of formation.

Referring to the drawings in particular, the invention embodied therein, comprises a method of manufacturing a regeneratively cooled rocket combustion chamber, generally designated 1, which includes a cylindrical portion 1a of substantially uniform dimensions which is connected at its discharge end to a thrust nozzle portion 2.

FIG. 1 shows a regeneratively cooled combustion chamber 1 and a thrust nozzle 2 for a liquid propellant rocket engine, in a perspective view. Substantially, the combustion chamber thrust nozzle unit 1, 2 comprises an inner shell 3, an outer shell 4 and webs 5 which extend in a radial direction between inner shell 3 and outer shell 4. Webs 5 form the lateral boundaries of longitudinally extending cooling channels 6 having varying cross-sections along their lengths. Slots 8 are provided within webs 5, which also extend in the longitudinal direction and are open to the hot gas area 7.

Figure 2:
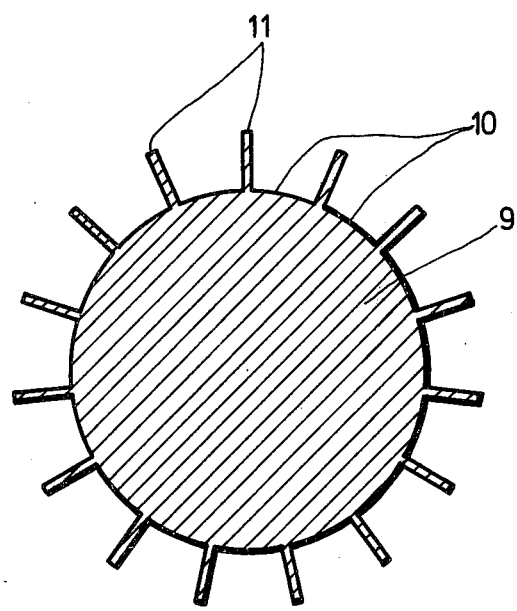
FIG. 2 is a sectional view of an electroplating core and with a portion of the core showing the formation of an electrodeposit over the core, the filling between webs with the defusable material and the partial removal of the core after electro-depositing.

Combustion chamber 1 and thrust nozzle 2 are made, for example, of nickel and are manufactured by electrodeposition, with the use of an electroplating core 9 which is shown in FIG. 2 in a sectional view and has an outside contour 10 corresponding to the inside contour of inner shell 3 and is provided with radial projections 11 forming mold blades for cooling channels 6.

In a first and single operational step, inner shell 3 and webs 5 with cooling channels 6 and slots 8 are formed by electrodeposition on electroplating core 9. The free faces of the webs are then finish-turned and cooling channels 6 are filled to level, for example, with a lost wax composition, and outer shell 4 is electrodeposited thereon. Thereupon, inlet and outlet holes are drilled in the channel end zones through which the wax, which is heated in a further operational step, can escape from cooling channels 6.

In a metal-removing process, electroplating core 9 which is made, for example, of aluminum or an aluminum-magnesium-copper alloy, is then hollowed out, except for some millimeters of residual wall thickness, and the hollow remnant of the core along with radial projections 11 is seared out with caustic soda.

Slots 8 formed in cooling channel webs 5 by the cauterization of radial core projections 11 are subsequently closed. For this purpose, combustion chamber 1 and thrust nozzle 2 are engaged on an exactly fitting mandrel 12 which is transversely parted in the nozzle throat plane, as shown in FIG. 3. In this position, a hydraulic pressure for example, is applied in cooling channels 6, acting from inside the channels, to an extent that cooling channel webs 5 are deformed to close slots 8.

While a specific embodiment of the invention has been shown and described in detail to illustrate the application of the principles of the invention, it will be understood that the invention may be embodied otherwise without departing from such principles.

What is claimed is:

1. A method of manufacturing a regeneratively cooled rocket combustion chamber, comprising cooling channels which extend in a longitudinal direction between an inner shell or wall having a smooth inside surface and an outer wall or shell, are which are bounded laterally by radially extending webs, and using an electroplating core which is made of a chemically dissolvable material which has an outside contour conformable to the inside contour of the inner wall and is provided with radial projections forming mold blades for the cooling channel webs, and also using a finishing mandrel of the exact interior wall dimensions of the combustion chamber, comprising forming the inner shell along with the cooling channel webs with outer free web faces by electro-depositing metal on the electroplating core, finish turning the free web faces to form outer finish web faces, filling the cooling channels with a multiple electrically well-conducting filling material up to the level of the finish turned free web faces, electro-depositing a metal layer around the complete periphery of the web faces and the filling material of the cooling channels to form the outer shell, melting the filling material out of the coolling channels, hollowing out the electroplating core except for some millimeters of residual wall thickness, dissolving the remnant of the core along with the radial projections to form the slots between the cooling channel webs which open into the center of the combustion chamber, engaging the entirely electrodeposited rocket combustion chamber on the finishing mandrel, and while it is on the mandrel, deforming the cooling channel by applying pressure from inside the channels in order to close the slots extending between the webs of adjacent cooling channels.

* * * * *